(12) United States Patent
Lee et al.

(10) Patent No.: US 12,316,451 B2
(45) Date of Patent: May 27, 2025

(54) TRANSMITTING DEVICE, TRANSMITTING AND RECEIVING SYSTEM USING THE TRANSMITTING DEVICE, AND TRANSMITTING AND RECEIVING METHOD

(71) Applicant: SK hynix Inc., Icheon-si (KR)

(72) Inventors: Gang Sik Lee, Icheon-si (KR); Young Taek Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 134 days.

(21) Appl. No.: 18/085,026

(22) Filed: Dec. 20, 2022

(65) Prior Publication Data

US 2023/0421294 A1   Dec. 28, 2023

(30) Foreign Application Priority Data

Jun. 23, 2022 (KR) .................. 10-2022-0077009

(51) Int. Cl.
*H04L 1/00* (2006.01)

(52) U.S. Cl.
CPC .......... *H04L 1/0071* (2013.01); *H04L 1/0041* (2013.01); *H04L 1/0057* (2013.01)

(58) Field of Classification Search
CPC ... H04L 1/0071; H04L 1/0041; H04L 1/0057; H04L 25/4915; H04L 25/4917; H04L 27/02; H04B 14/023

USPC ................. 714/748–750, 752, 755
See application file for complete search history.

(56) References Cited

U.S. PATENT DOCUMENTS

| | | |
|---|---|---|
| 10,491,238 B2 * | 11/2019 | Sudhakaran .......... H03M 5/145 |
| 2004/0073861 A1 * | 4/2004 | Lauer .................... H04L 1/0071 |
| | | 714/762 |
| 2019/0199560 A1 * | 6/2019 | Bossard ............. H04L 25/4917 |
| 2019/0305995 A1 * | 10/2019 | Lee ......................... H04B 3/32 |
| 2022/0231771 A1 * | 7/2022 | Sugiyama ........... H04B 17/309 |
| 2022/0294476 A1 * | 9/2022 | Seol ..................... H04L 25/4917 |
| 2022/0294554 A1 * | 9/2022 | Seol ....................... H04L 1/0041 |
| 2022/0327067 A1 * | 10/2022 | Seol .................... H04L 25/4915 |

FOREIGN PATENT DOCUMENTS

KR   1020220132368 A   9/2022

\* cited by examiner

*Primary Examiner* — Albert Decady
*Assistant Examiner* — Osman M Alshack
(74) *Attorney, Agent, or Firm* — WILLIAM PARK & ASSOCIATES LTD.

(57) ABSTRACT

A transmitting device is configured to generate a first encoded symbol and a second encoded symbol by encoding a first burst and a second burst, respectively. The transmitting device is configured to generate a first transmitting symbol and a second transmitting symbol by selectively inverting the first and second encoded symbols on the basis of a logic level of a bit with a specific sequence number of each of a previously generated transmitting symbol and the first burst.

23 Claims, 9 Drawing Sheets

FIG. 1
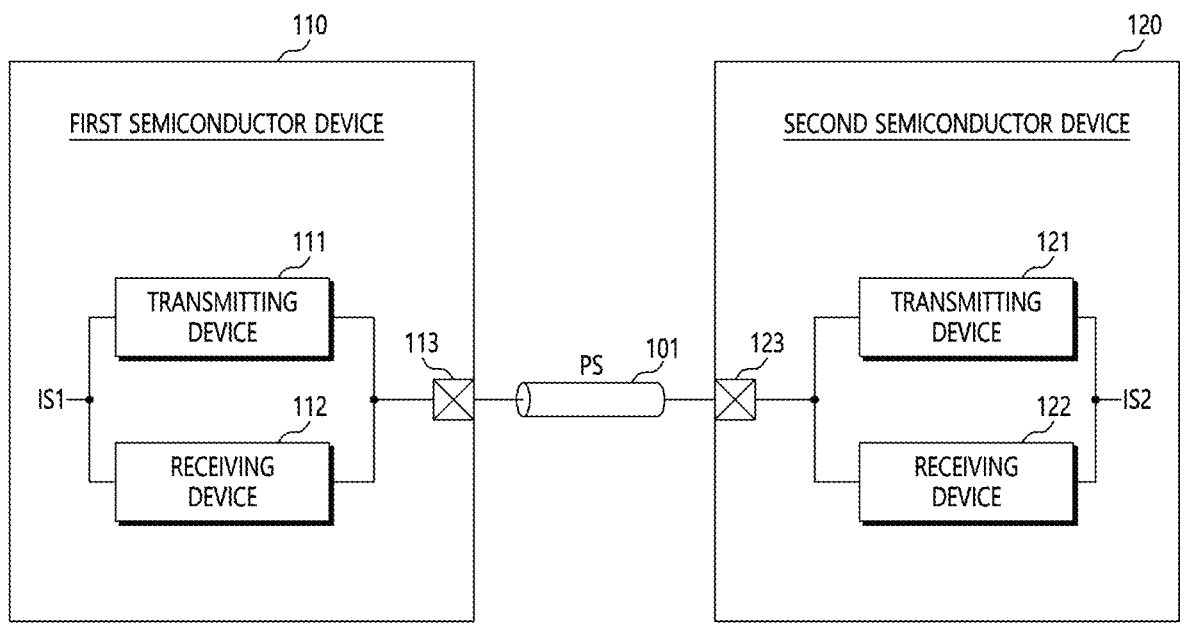
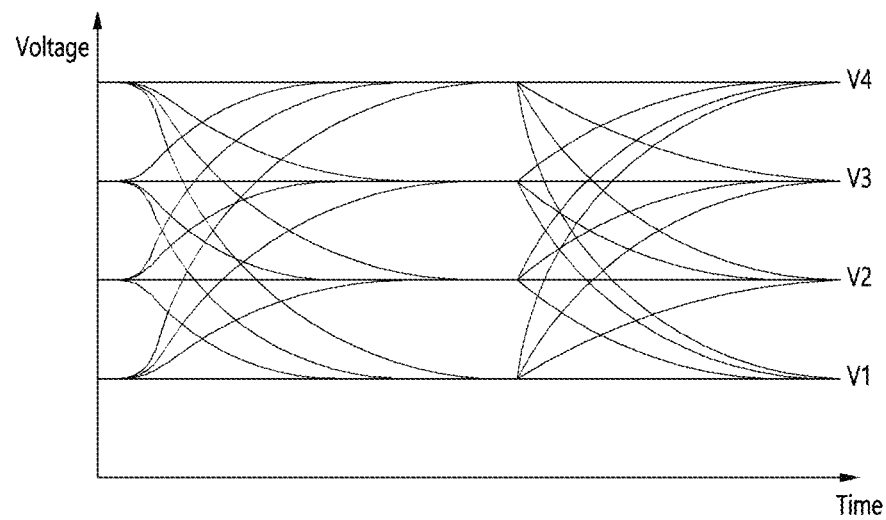

TRANSMITTING DEVICE, TRANSMITTING AND RECEIVING SYSTEM USING THE TRANSMITTING DEVICE, AND TRANSMITTING AND RECEIVING METHOD

CROSS-REFERENCES TO RELATED APPLICATION

The present application claims priority under 35 U.S.C. § 119(a) to Korean application number 10-2022-0077009, filed on Jun. 23, 2022, in the Korean Intellectual Property Office, which is incorporated herein by reference in its entirety.

BACKGROUND

1. Technical Field

The present disclosure relates to an integrated circuit technology, and more particularly, to a transmitting device, a transmitting and receiving system using the transmitting device, and a transmitting and receiving method.

2. Related Art

An electronic device includes many electronic components, and among them, a computer system may include many semiconductor devices each made of semiconductors. The semiconductor devices constituting the computer system may communicate with each other by transmitting and receiving clock signals and data. The semiconductor devices may be connected to other semiconductor devices through a signal bus such as a data bus, and may transmit a signal having information corresponding to data through the signal bus. The semiconductor devices may each include a signal transmitting circuit in order to transmit the signal through the signal bus, and the signal transmitting circuit may transmit the signal by transmitting an analog voltage through the signal bus. In general, the signal transmitting circuit may transmit an analog voltage corresponding to a high logic level and an analog voltage corresponding to a low logic level. However, in order to transmit more information through one-time signal transmission, a multi-level signal transmission method using pulse amplitude modulation (PAM) is used. In the multi-level signal transmission method, two or more bits of digital information may be transmitted as one analog signal by subdividing the level of the analog voltage transmitted through the signal bus.

SUMMARY

A transmitting device according to an embodiment of the present disclosure may include an inversion determination circuit, an encoding block, and an inversion block. The inversion determination circuit may be configured to generate a first inversion signal and a second inversion signal on the basis of a logic level of a bit with a specific sequence number of each of a previously generated transmitting symbol and a first burst. The encoding block may be configured to generate a first encoded symbol and a second encoded symbol by encoding the first burst and a second burst. The inversion block may be configured to generate a first transmitting symbol by selectively inverting the first encoded symbol on the basis of the first inversion signal, and to generate a second transmitting symbol by selectively inverting the second encoded symbol on the basis of the second inversion signal.

A transmitting and receiving method according to an embodiment of the present disclosure may include dividing output data into a plurality of bursts. The method may include determining whether a bit with a specific sequence number of each of a previously generated transmitting symbol and a bit with a specific sequence number of each of the plurality of bursts each have a first logic level. The method may include generating a plurality of encoded symbols by encoding the plurality of bursts so that a maximum transition is avoided. The method may include generating a plurality of transmitting symbols by selectively inverting the plurality of encoded symbols on the basis of a result of the determination. The method may include transmitting a PAM-4 signal on the basis of the plurality of transmitting symbols.

A transmitting and receiving system according to an embodiment of the present disclosure may include a transmitting device configured to transmit a PAM-4 signal and a receiving device configured to receive the PAM-4 signal. The transmitting device may include a symbol encoding circuit and a transmitting circuit. The symbol encoding circuit may be configured to divide output data into a first burst and a second burst, to generate a first encoded symbol and a second encoded symbol by encoding the first burst and the second burst, to generate a first transmitting symbol by selectively inverting the first encoded symbol on the basis of a logic level of a bit with a specific sequence number of a previously generated transmitting symbol, and to generate a second transmitting symbol by selectively inverting the second encoded symbol on the basis of a logic level of a bit with a specific sequence number of the first burst. The transmitting circuit may be configured to transmit the PAM-4 signal on the basis of the first and second transmitting symbols.

BRIEF DESCRIPTION OF THE DRAWINGS

FIG. 1 is a diagram illustrating a configuration of a semiconductor system in accordance with an embodiment of the present disclosure and a voltage level of a transmitted signal transmitted through a transmission signal bus.

DETAILED DESCRIPTION

Figure 2:
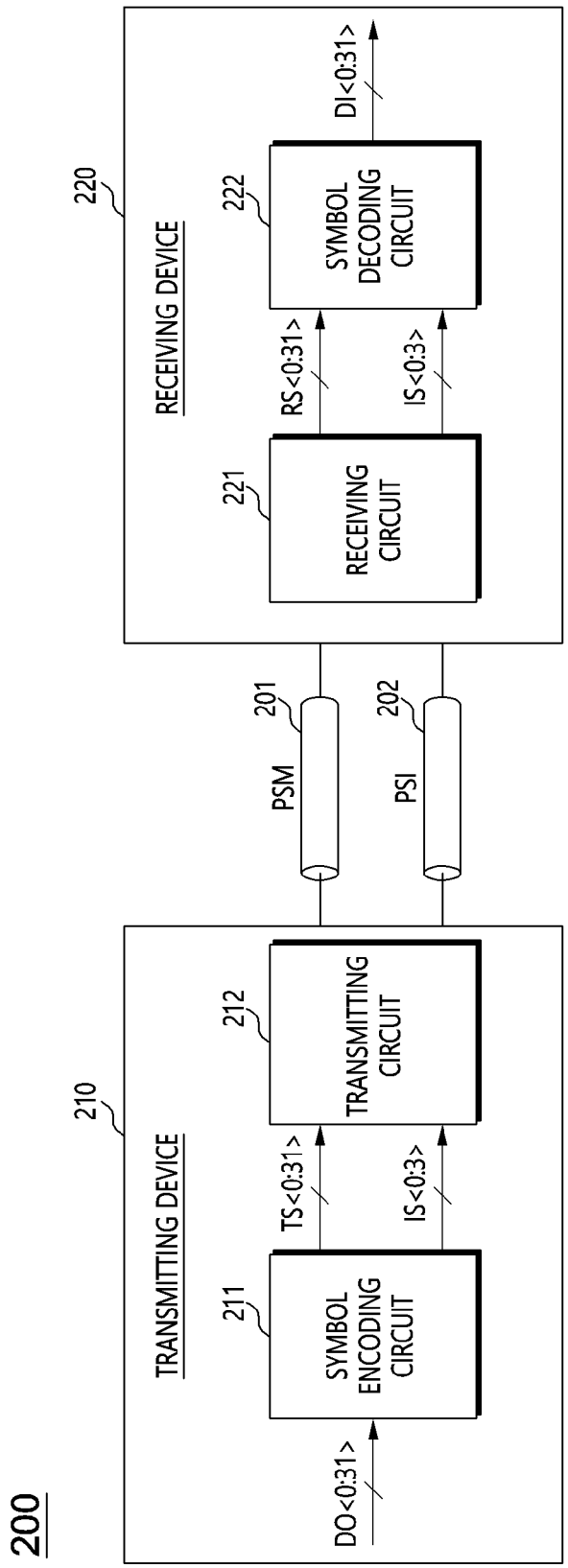
FIG. 2 is a diagram illustrating a configuration of a transmitting and receiving system in accordance with an embodiment of the present disclosure.

FIG. 1 is a diagram illustrating a configuration of a semiconductor system 1 in accordance with an embodiment of the present disclosure and a voltage level of a transmitted signal PS transmitted through a transmission signal bus 101. In FIG. 1, the semiconductor system 1 may include a first semiconductor device 110 and a second semiconductor device 120. The first semiconductor device 110 may provide various control signals necessary for an operation of the second semiconductor device 120. The first semiconductor device 110 may include various types of host devices. For example, the first semiconductor device 110 may include at least one of a central processing unit (CPU), a graphics processing unit (GPU), a multi-media processor (MMP), a digital signal processor, an application processor (AP), and a memory controller. The second semiconductor device 120 may be, for example, a memory device, and examples of the memory device may include a volatile memory and a nonvolatile memory. Examples of the volatile memory may include a static RAM (SRAM), a dynamic RAM (DRAM), and a synchronous DRAM (SDRAM), and examples of the nonvolatile memory may include a read only memory (ROM), a programmable ROM (PROM), and an electrically erasable and programmable memory (EEPROM), an electrically programmable ROM (EPROM), a flash memory, a phase change RAM (PRAM), a magnetic RAM (MRAM), a resistive RAM (RRAM), a ferroelectric RAM (FRAM), and the like.

The second semiconductor device 120 may be connected to the first semiconductor device 110 through a plurality of buses. The plurality of buses may be signal transmission lines, links, or channels for transmitting signals. Although not illustrated in the drawing, for example, the plurality of buses may include a clock bus, a command address bus, a data bus, or the like. The clock bus and the command address bus may be unidirectional buses, and the data bus may be a bidirectional bus. The second semiconductor device 120 may be connected to the first semiconductor device 110 through the transmission signal bus 101. The transmission signal bus 101 may include any type of bus for transmitting a signal synchronized with a clock signal. For example, the transmission signal bus 101 may be a bidirectional bus such as the data bus. In an embodiment, the transmission signal bus 101 may be a unidirectional bus, and even when the transmission signal bus 101 is a unidirectional bus, the technical spirit of the present disclosure may be similarly applied. The transmitted signal PS transmitted through the transmission signal bus 101 may be a multi-level signal. For example, the transmitted signal PS may be a 4-level pulse amplitude modulation (PAM-4) signal that may have at least four different voltage levels. The transmitted signal PS may have one of the four different voltage levels according to a value of a symbol. The symbol may include at least two binary bits. The symbol may have at least a first state, a second state, a third state, and a fourth state. The first state may correspond to a logic value of 0, 0, the second state may correspond to a logic value of 0, 1, the third state may correspond to a logic value of 1, 0, and the fourth state may correspond to a logic value of 1, 1. The transmitted signal PS may have a first voltage level V1, a second voltage level V2, a third voltage level V3, and a fourth voltage level V4.

The graph illustrated in FIG. 1 is a diagram illustrating the voltage level of the transmitted signal PS transmitted through the transmission signal bus 101. In the graph, an x-axis may denote time and a y-axis may denote voltage. In order to transmit a symbol in the first state, the transmitted signal PS may have the first voltage level V1. In order to transmit a symbol in the second state, the transmitted signal PS may have the second voltage level V2. In order to transmit a symbol in the third state, the transmitted signal PS may have the third voltage level V3. In order to transmit a symbol in the fourth state, the transmitted signal PS may have the fourth voltage level V4. The second voltage level V2 may be higher than the first voltage level V1, the third voltage level V3 may be higher than the second voltage level V2, and the fourth voltage level V4 may be higher than the third voltage level V3. The transmitted signal PS may substantially maintain a current voltage level or the voltage level thereof may be changed to three other voltage levels depending on whether the state of the symbol transitions. For example, when the symbol transitions from the second state to the third state, the voltage level of the transmitted signal PS may be changed from the second voltage level V2 to the third voltage level V3.

The first semiconductor device 110 may include a transmitting device 111 and a receiving device 112. The transmitting device 111 and the receiving device 112 may be connected to the transmission signal bus 101 through a pad 113. The transmitting device 111 may receive an internal signal IS1 of the first semiconductor device 110 and transmit a transmitted signal PS generated on the basis of the internal signal IS1 to the second semiconductor device 120 through the pad 113 and the transmission signal bus 101. The receiving device 112 may receive the transmitted signal PS transmitted through the transmission signal bus 101 and the pad 113, and generate the internal signal IS1 on the basis of the transmitted signal PS. For example, the transmitting device 111 may generate the transmitted signal PS having one of the first to fourth voltage levels V1 to V4 according to a state of a symbol generated on the basis of a bit stream of the internal signal IS1. The transmitting device 111 may include a digital to analog converter (DAC) that converts the bit stream of the internal signal IS1, which is a digital signal, into the transmitted signal PS which is an analog voltage. The receiving device 112 may detect a voltage level of the transmitted signal PS and restore the bit stream from the transmitted signal PS. The receiving device 112 may restore the symbol from the transmitted signal PS and generate the bit stream of the internal signal IS1 on the basis of the symbol. The receiving device 112 may include an analog to digital converter (ADC) that converts the transmitted signal PS, which is an analog voltage, into the bit stream which is a digital signal.

The second semiconductor device 120 may include a transmitting device 121 and a receiving device 122. The transmitting device 121 and the receiving device 122 may be connected to the transmission signal bus 101 through a pad 123. The transmitting device 121 may receive an internal signal IS2 of the second semiconductor device 120 and transmit a transmitted signal PS generated on the basis of the internal signal IS2 to the first semiconductor device 110 through the pad 123 and the transmission signal bus 101. The receiving device 122 may receive the transmitted signal PS transmitted through the transmission signal bus 101 and the pad 123, and generate the internal signal IS2 on the basis of the transmitted signal PS. For example, the transmitting device 121 may generate the transmitted signal PS having one of the first to fourth voltage levels V1 to V4 according to a state of a symbol generated on the basis of a bit stream of the internal signal IS2. The transmitting device 121 may include a digital to analog converter (DAC) that converts the bit stream of the internal signal IS2, which is a digital signal, into the transmitted signal PS which is an analog voltage. The receiving device 122 may detect a voltage level of the transmitted signal PS and restore the bit stream from the transmitted signal PS. The receiving device 122 may restore the symbol from the transmitted signal PS and generate the bit stream of the internal signal IS2 on the basis of the symbol. The receiving device 122 may include an analog to digital converter (ADC) that converts the transmitted signal PS, which is an analog voltage, into the bit stream which is a digital signal.

FIG. 2 is a diagram illustrating a configuration of a transmitting and receiving system 200 according to an embodiment of the present disclosure. Referring to FIG. 2, the transmitting and receiving system 200 may include a transmitting device 210 and a receiving device 220. The transmitting device 210 may transmit a PAM-4 signal PSM to the receiving device 220, and the receiving device 220 may receive the PAM-4 signal PSM transmitted from the transmitting device 210. The transmitting device 210 and the receiving device 220 may be provided in different semiconductor devices. The transmitting device 210 may be applied as each of the transmitting devices 111 and 121 illustrated in FIG. 1, and the receiving device 220 may be applied as each of the receiving devices 112 and 122 illustrated in FIG. 1. In an embodiment, the transmitting device 210 may also be provided in the same semiconductor device as the receiving device 220.

The transmitting device 210 may divide a full burst DO<0:31> corresponding to output data into a plurality of bursts, and generate a plurality of symbols on the basis of each burst. The full burst may include at least 16 bits, and may be divided into at least two bursts. In FIG. 2, the full burst DO<0:31> of the output data may be 32 bits, and the full burst may be divided by 8 bits. The output data may be divided into a first burst DO<0:7>, a second burst DO<8:15>, a third burst DO<16:23> and a fourth burst DO<24:31>. However, such division of the output data does not intend to limit the number of bits and the number of bursts in the full burst, and the number of bits and the number of bursts in the full burst may be variously changed. The transmitting device 210 may generate the PAM-4 signal PSM on the basis of the plurality of symbols and transmit the PAM-4 signal PSM to the receiving device 220 through a first transmission signal bus 201. The PAM-4 signal PSM may be a multi-level signal having a plurality of voltage levels as illustrated in FIG. 1. The first transmission signal bus 201 may be a bidirectional bus and a data bus. The receiving device 220 may receive the PAM-4 signal PSM through the first transmission signal bus 201 and restore the plurality of symbols from the PAM-4 signal PSM. The receiving device 220 may generate a full burst DI<0:31> corresponding to input data on the basis of the restored symbols. The input data may have a value corresponding to the output data.

The transmitting device 210 may include a symbol encoding circuit 211 and a transmitting circuit 212. The symbol encoding circuit 211 may receive the full burst DO<0:31> of the output data. The full burst DO<0:31> of the output data may be 32 bits, and may be divided into the first burst DO<0:7>, the second burst DO<8:15>, the third burst DO<16:23>, and the fourth burst DO<24:31> each including 8 bits. The symbol encoding circuit 211 may generate first to fourth encoded symbols by encoding the first to fourth bursts DO<0:7>, DO<8:15>, DO<16:23>, and DO<24:31>. The symbol encoding circuit 211 may encode the first to fourth bursts DO<0:7>, DO<8:15>, DO<16:23>, and DO<24:31> into the first to fourth encoded symbols on the basis of a code book. The code book may map the burst to a symbol capable of avoiding a maximum transition. The maximum transition may mean that a voltage level change occurring between consecutively transmitted PAM-4 signals is maximum. For example, when a previously transmitted PAM-4 signal has the first voltage level V1 or the fourth voltage level V4 illustrated in FIG. 1 and a currently transmitted PAM-4 signal has the fourth voltage level V4 or the first voltage level V1, the maximum transition may occur. The maximum transition may reduce an effective duration of the PAM-4 signal and increase consumption of power required for transmitting the PAM-4 signal. Accordingly, in an embodiment, the symbol encoding circuit 211 may convert the burst into a symbol capable of avoiding the maximum transition according to the code book, thereby reducing power used for transmitting the PAM-4 signal and extending the effective duration of the PAM-4 signal.

When a plurality of encoded symbols corresponding to a plurality of bursts are transmitted as the PAM-4 signal, the symbol encoding circuit 211 may selectively invert the plurality of encoded symbols to avoid a maximum transition between the plurality of encoded symbols. The symbol encoding circuit 211 may invert the most significant bits of the plurality of encoded symbols. For example, when a PAM-4 signal corresponding to the last symbol of the first encoded symbol is transmitted and then a PAM-4 signal corresponding to a first symbol of the second encoded symbol is transmitted, the symbol encoding circuit 211 may determine whether a maximum transition occurs between the two PAM-4 signals and invert the most significant bits of the second encoded symbol, on the basis the determination result. The symbol encoding circuit 211 may generate a plurality of transmitting symbols TS<0:31> by selectively inverting the plurality of encoded symbols. The symbol encoding circuit 211 may generate a first transmitting symbol TS<0:7> by selectively inverting the first encoded symbol, and generate a second transmitting symbol TS<8:15> by selectively inverting the second encoded symbol. The symbol encoding circuit 211 may generate a third transmitting symbol TS<16:23> by selectively inverting the third encoded symbol, and generate a fourth transmitting symbol TS<24:31> by selectively inverting the fourth encoded symbol.

The symbol encoding circuit 211 may determine whether to invert the first encoded symbol on the basis of the logic level of a bit with a specific sequence number of a previously generated transmitting symbol. The symbol encoding circuit 211 may determine whether to invert the second encoded symbol on the basis of a logic level of a bit with a specific sequence number of the first burst DO<0:7>. The symbol encoding circuit 211 may determine whether to invert the third encoded symbol on the basis of a logic level of a bit with a specific sequence number of the second burst DO<8:15>. The symbol encoding circuit 211 may determine whether to invert the fourth encoded symbol on the basis of a logic level of a bit with a specific sequence number of the third burst DO<16:23>. The bit with the specific sequence number may be the last most significant bit of each of the transmitting symbol and the burst. The symbol encoding circuit 211 may invert each of the plurality of encoded symbols when the last most significant bits of the transmitting symbol and the burst each have a first logic level, and might not invert each of the plurality of encoded symbols when the last most significant bits each have a second logic level. The first logic level may be a high logic level and the second logic level may be a low logic level. In an embodiment, the first logic level may be a low logic level and the second logic level may be a high logic level. Since the symbol encoding circuit 211 uses a previously generated transmitting symbol in order to determine whether to invert the first encoded symbol, and uses the first to third bursts DO<0:7>, DO<8:15>, and DO<16:31> instead of the previously generated transmitting symbol in order to determine whether to invert the second to fourth encoded symbols, time for converting the burst into the transmitting symbol in order to avoid the maximum transition may be shortened and the number of required logic stages and a delay time may be reduced. Accordingly, a high-speed operation of the transmitting and receiving system 200 may be implemented. In an embodiment, the symbol encoding circuit 211 may be modified to invert each of the plurality of encoded symbols when the last most significant bit has a second logic level and not to invert each of the plurality of encoded symbols when the last most significant bit has a first logic level.

The symbol encoding circuit 211 may extract at least one bit of each of the first to fourth bursts DO<0:7>, DO<8:15>, DO<16:23>, and DO<24:31>, and generate an interleaved symbol IS<0:3> on the basis of the extracted bits. The symbol encoding circuit 211 may generate the encoded symbol by encoding the remaining bits of the burst except for the bits extracted in order to generate the interleaved symbol IS<0:3>. The present disclosure is not limited thereto, and the at least one bit may be the first bit DO<0> of the first burst DO<0:7>, the first bit DO<8> of the second burst DO<8:15>, the first bit DO<16> of the third burst DO<16:23>, and the first bit DO<24> of the fourth burst DO<24:31>.

The transmitting circuit 212 may be connected to the symbol encoding circuit 211 and may receive the plurality of transmitting symbols TS<0:31> from the symbol encoding circuit 211. The transmitting circuit 212 may generate the PAM-signal PSM on the basis of the plurality of transmitting symbols TS<0:31>. The transmitting circuit 212 may transmit the PAM-4 signal PSM to the receiving device 220 by driving the first transmission signal bus 201 on the basis of the first to fourth transmitting symbols TS<0:7>, TS<8:15>, TS<16:23>, and TS<24:31>. The transmitting circuit 212 may serialize the first to fourth transmitting symbols TS<0:7>, TS<8:15>, TS<16:23>, and TS<24:31>, and sequentially transmit the PAM-4 signal PSM corresponding to the first to fourth transmitting symbols TS<0:7>, TS<8:15>, TS<16:23>, and TS<24:31>.

The transmitting circuit 212 may further receive the interleaved symbol IS<0:3> from the symbol encoding circuit 211. The transmitting circuit 212 may transmit a PAM-4 signal PSI on the basis of the interleaved symbol IS<0:3>. The transmitting circuit 212 may transmit the PAM-4 signal PSI through a second transmission signal bus 202 different from the first transmission signal bus 201. The second transmission signal bus 202 may be a data bus or any bidirectional bus. In an embodiment, the transmitting circuit 212 may transmit the PAM-4 signal PSM corresponding to the first to fourth transmitting symbols TS<0:7>, TS<8:15>, TS<16:23>, and TS<24:31> and then transmit the PAM-4 signal PSI corresponding to the interleaved symbol IS<0:3> through the first transmission signal bus 201. The transmitting circuit 212 may transmit the PAM-4 signal PSI generated on the basis of the interleaved symbol IS<0:3> at the same time or after the PAM-4 signal PSM generated on the basis of the first to fourth transmitting symbols TS<0:7>, TS<8:15>, TS<16:23>, and TS<24:31> is transmitted.

The receiving device 220 may include a receiving circuit 221 and a symbol decoding circuit 222. The receiving circuit 221 may be connected to the first transmission signal bus 201 and may receive the PAM-4 signal PSM transmitted from the transmitting device 210 through the first transmission signal bus 201. The receiving circuit 221 may generate a plurality of received symbols RS<0:31> on the basis of the PAM-4 signal PSM. The receiving circuit 221 may receive a first received symbol RS<0:7>, a second received symbol RS<8:15>, a third received symbol RS<16:23>, and a fourth received symbol RS<24:31> from the PAM-4 signal PSM sequentially transmitted. The first received symbol RS<0:7> may have substantially the same logic value as the first transmitting symbol TS<0:7>, and the second received symbol RS<8:15> may have substantially the same logic value as the second transmitting symbol TS<8:15>. The third received symbol RS<16:23> may have substantially the same logic value as the third transmitting symbol TS<16:23>, and the fourth received symbol RS<24:31> may have substantially the same logic value as the fourth transmitting symbol TS<24:31>. The receiving circuit 221 may be further connected to the second transmission signal bus 202. The receiving circuit 221 may receive the PAM-4 signal PSI through the first transmission signal bus 201 or the second transmission signal bus 202. The receiving circuit 221 may generate the interleaved symbol IS<0:3> on the basis of the PAM-4 signal PSI.

The symbol decoding circuit 222 may be connected to the receiving circuit 221 and may receive the plurality of received symbols RS<0:31> from the receiving circuit 221. The symbol decoding circuit 222 may generate a plurality of decoded symbols by selectively inverting the plurality of received symbols RS<0:31>. The symbol decoding circuit 222 may determine whether a symbol has been inverted by the symbol encoding circuit 221 and selectively invert the plurality of received symbols RS<0:31> according to the determination result. The symbol decoding circuit 222 may generate a first decoded symbol by selectively inverting the first received symbol RS<0:7>, and generate a second decoded symbol by selectively inverting the second received symbol RS<8:15>. The symbol decoding circuit 222 may generate a third decoded symbol by selectively inverting the third received symbol RS<16:23>, and generate a fourth decoded symbol by selectively inverting the fourth received symbol RS<24:31>. The symbol decoding circuit 222 may invert the most significant bits of the first to fourth received symbols RS<0:7>, RS<8:15>, RS<16:23>, and RS<24:31>.

The symbol decoding circuit 222 may determine whether to invert the plurality of received symbols RS<0:31> on the basis of a previously generated received symbol and a previously received symbol. The symbol decoding circuit 222 may determine whether to invert the plurality of received symbols RS<0:31> on the basis of the logic level of a bit with a specific sequence number of each of the previously generated received symbol and the previously received symbol. The symbol decoding circuit 222 may determine whether to invert the first received symbol RS<0:7> on the basis of the logic level of a bit with a specific sequence number of a received symbol generated before the plurality of received symbols are generated. The symbol decoding circuit 222 may determine whether to invert the second received symbol RS<8:15> on the basis of the logic level of a bit with a specific sequence number of the first received symbol RS<0:7>. The symbol decoding circuit 222 may determine whether to invert the third received symbol RS<16:23> on the basis of the logic level of a bit with a specific sequence number of the second received symbol RS<8:15>. The symbol decoding circuit 222 may determine whether to invert the fourth received symbol RS<24:31> on the basis of the logic level of a bit with a specific sequence number of the third received symbol RS<16:23>. The bit with the specific sequence number may be the last most significant bit of the received symbol. The symbol decoding circuit 222 may invert the most significant bits of the plurality of received symbols when the last most significant bit of each received symbol has a first logic level, and might not invert the most significant bits of the plurality of received symbols when the last most significant bit has a second logic level. In an embodiment, the symbol decoding circuit 222 may be modified to invert the most significant bits of the plurality of received symbols when the last most significant bit of each received symbol has a second logic level, and not to invert the last most significant bits of the plurality of received symbols when the last most significant bit has a first logic level. When the symbol encoding circuit 211 detects whether the last most significant bits of a transmitting symbol and a burst each have a first logic level and inverts an encoded symbol, the symbol decoding circuit 222 may detect whether the last most significant bit of a previously received symbol has a first logic level and invert the received symbol. On the other hand, when the symbol encoding circuit 211 detects whether the last most significant bits of a transmitting symbol and a burst each have a second logic level and inverts an encoded symbol, the symbol decoding circuit 222 may detect whether the last most significant bit of a previously received symbol has a second logic level and invert the received symbol.

The symbol decoding circuit 222 may generate a plurality of decoded bursts by decoding the plurality of decoded symbols, and generate input data on the basis of the plurality of decoded bursts. The symbol decoding circuit 222 may further receive the interleaved symbol IS<0:3>. The symbol decoding circuit 222 may generate the full burst DI<0:31> of the input data by combining the plurality of decoded bursts with the interleaved symbol IS<0:3>. The full burst DI<0:31> of the input data may have substantially the same logic value as the full burst DO<0:31> of the output data of the transmitting device 210.

Figure 3:
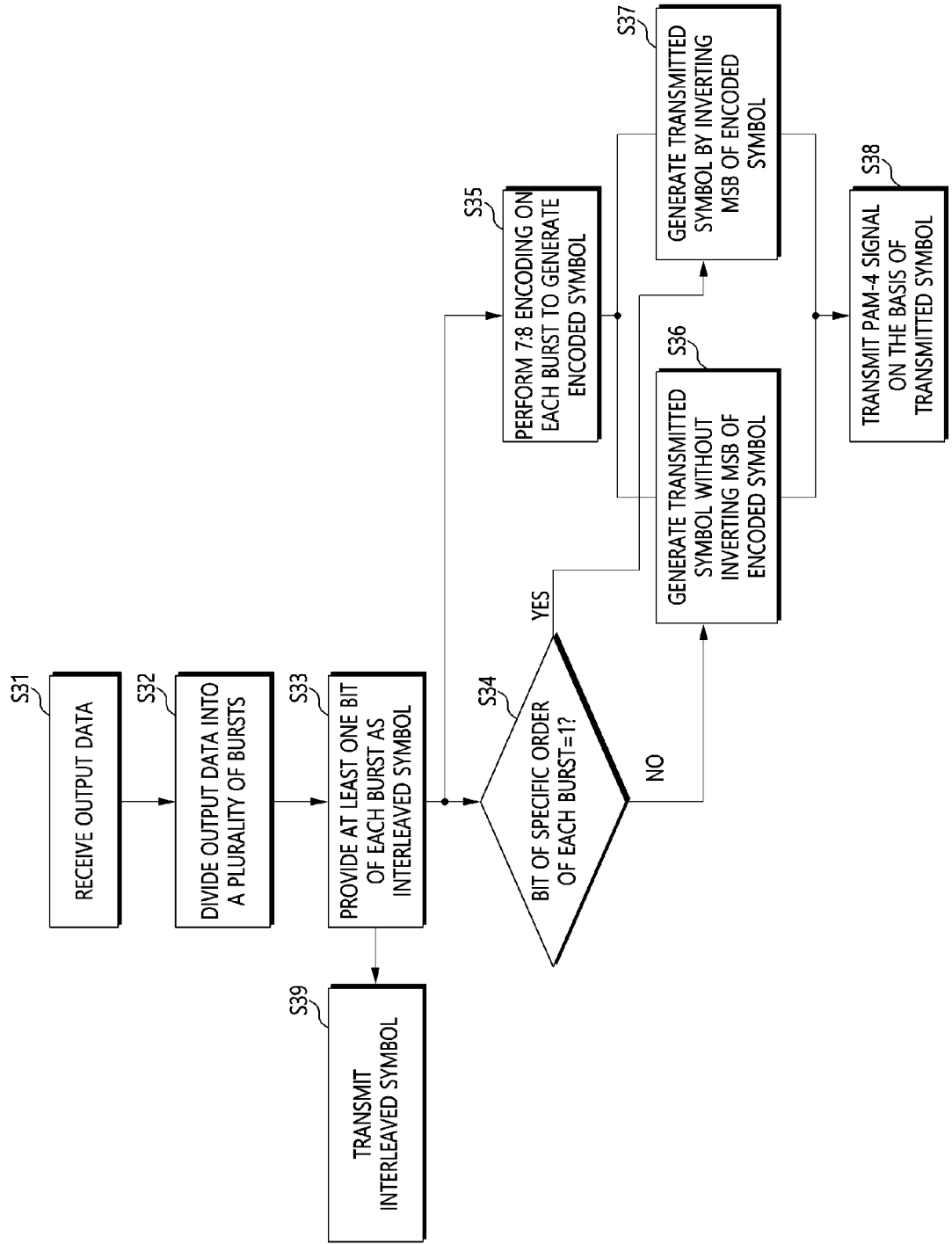
FIG. 3 is a flowchart illustrating an operation of a transmitting device in accordance with an embodiment of the present disclosure.

FIG. 3 is a flowchart illustrating the operation of the transmitting device 210 illustrated in FIG. 2. Referring to FIG. 2 and FIG. 3, the transmitting device 210 according to an embodiment of the present disclosure may operate as follows. In an embodiment, the transmitting device 210 may encode symbols for generating the PAM-4 signal PSM in order to avoid the occurrence of a maximum transition in the PAM-4 signal PSM transmitted through the first transmission signal bus 201. In step S31, the symbol encoding circuit 211 may receive the full burst DO<0:31> of the output data. In step S32, the full burst DO<0:31> of the output data provided to the symbol encoding circuit 211 may be divided into a plurality of bursts. For example, the symbol encoding circuit 211 may divide 32-bit output data into the first to fourth bursts DO<0:7>, DO<8:15>, DO<16:23>, and DO<24:31> each including 8 bits. In step S33, the symbol encoding circuit 211 may extract at least one bit of each of the first to fourth bursts DO<0:7>, DO<8:15>, DO<16:23>, and DO<24:31> in order to generate the interleaved symbol IS<0:3>. The extracted bits may be used to generate the interleaved symbol IS<0:3>. In step S34, it may be determined whether a bit with a specific sequence number of a previously generated transmitting symbol and a bit with a specific sequence number of each burst are each 1. Whether to invert the encoded symbol may be determined according to whether the bit with the specific sequence number of the previously generated transmitting symbol and the bit with the specific sequence number of each burst are each 1.

Step S35 may be performed in parallel with step S34. In step S35, each burst may be encoded and generated as a plurality of encoded symbols. The symbol encoding circuit 211 may generate the first to fourth encoded symbols by performing 7:8 encoding on the first to fourth bursts DO<0:7>, DO<8:15>, DO<16:23>, and DO<24:31>. When the result of step S34 is "No", the plurality of encoded symbols might not be inverted and may be provided as the plurality of transmitting symbols TS<0:31> in step S36. When the result of step S34 is "YES", the plurality of encoded symbols may be inverted and the plurality of inverted encoded symbols may be provided as the plurality of transmitting symbols TS<0:31> in step S37. The symbol encoding circuit 211 may generate the plurality of transmitting symbols TS<0:31> by inverting the most significant bits of the plurality of encoded symbols. In step S38, the PAM-4 signal may be transmitted on the basis of the transmitting symbol. The transmitting circuit 212 may receive the plurality of transmitting symbols TS<0:31> output from the symbol encoding circuit 211. The transmitting circuit 212 may transmit the PAM-4 signal PSM by driving the first transmission signal bus 201 on the basis of the plurality of transmitting symbols TS<0:31>. In step S39, the interleaved symbol IS<0:3> may be transmitted. Step S39 may be performed in parallel with step S38, or may be performed after step S38 is performed. The transmitting circuit 212 may receive the interleaved symbol IS<0:3> from the symbol encoding circuit 211, and transmit the PAM-4 signal PSM on the basis of the interleaved symbol IS<0:3>. The transmitting circuit 212 may transmit the PAM-4 signal PSI by driving the first transmission signal bus 201 or the second transmission signal bus 202 on the basis of the interleaved symbol IS<0:3>.

Figure 4:
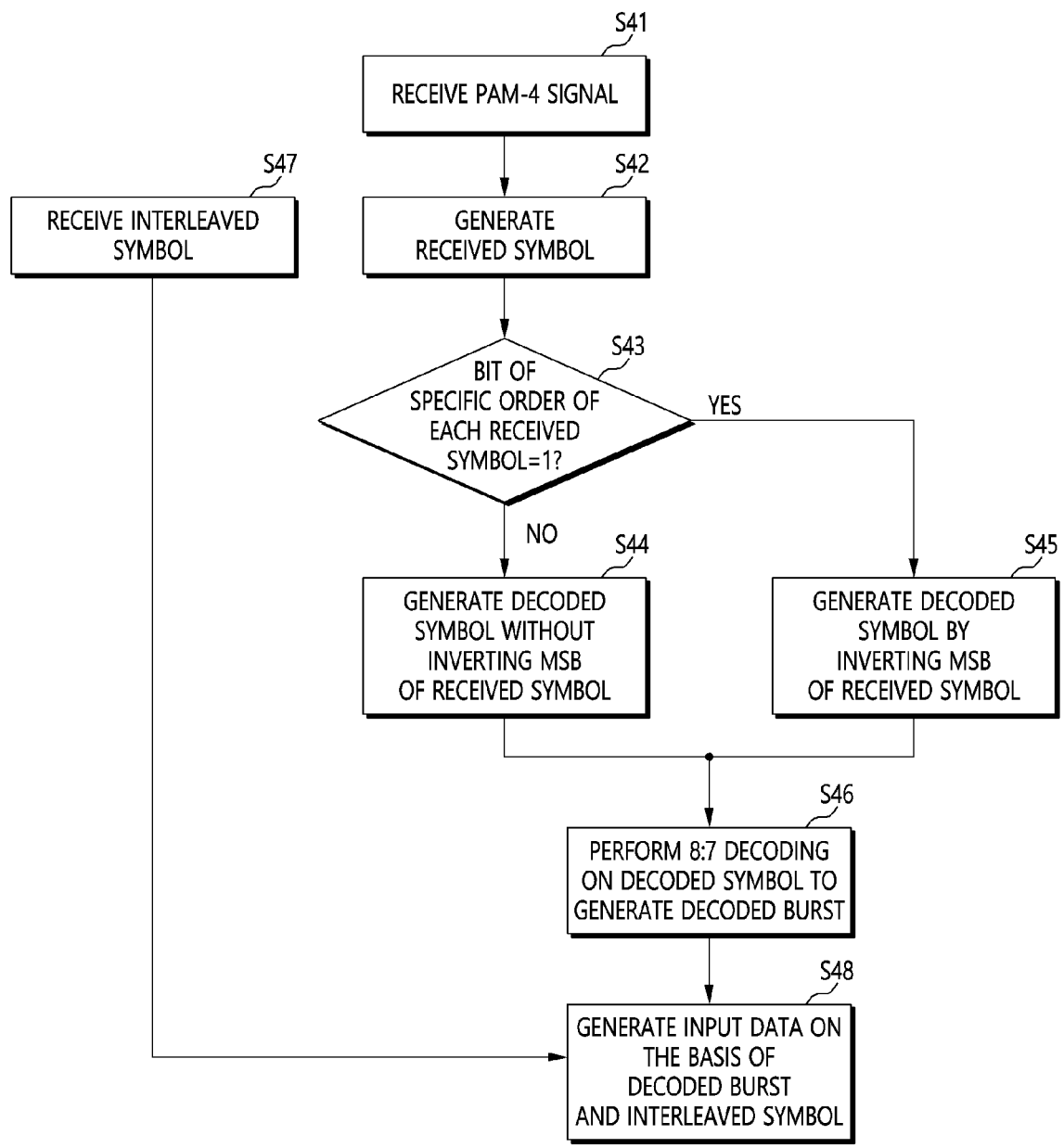
FIG. 4 is a flowchart illustrating an operation of a receiving device in accordance with an embodiment of the present disclosure.

FIG. 4 is a flowchart illustrating the operation of the receiving device 220 illustrated in FIG. 2. The operation of the receiving device 220 according to an embodiment of the present disclosure will be described as follows with reference to FIG. 2 to FIG. 4. At S41, the receiving device 220 may receive the PAM-4 signal PSM transmitted through the first transmission signal bus 201. At S42, the plurality of received symbols RS<0:31> may be generated on the basis of the PAM-4 signal PSM. The receiving circuit 221 may convert the PAM-4 signal PSM into a digital signal and generate the plurality of received symbols RS<0:31> on the basis of the digital signal. The plurality of received symbols RS<0:31> may have substantially the same logic value as the plurality of transmitting symbols TS<0:31> generated by the symbol encoding circuit 211. At S43, it may be determined whether a bit with a specific sequence number of a previously generated received symbol is 1. The symbol decoding circuit 222 may receive the plurality of received symbols RS<0:31>. The symbol decoding circuit 222 may determine whether to invert the plurality of received symbols RS<0:31> according to whether the bit with the specific sequence number of the previously generated received symbol is 1. When the result of S43 is "No", at S44, the plurality of received symbols RS<0:31> might not be inverted and may be provided as the plurality of decoded symbols. When the result of S43 is "YES", at S45, the plurality of received symbols RS<0:31> may be inverted and the plurality of inverted received symbols may be provided as the plurality of decoded symbols. The symbol decoding circuit 222 may generate the plurality of decoded symbols by inverting the most significant bits of the plurality of received symbols RS<0:31>. The plurality of decoded symbols may have substantially the same logic level as the plurality of encoded symbols generated by the symbol encoding circuit 211. At S46, 8:7 decoding may be performed on the plurality of decoded symbols and the plurality of decoded bursts may be generated. The symbol decoding circuit 222 may generate the plurality of decoded bursts by decoding the plurality of decoded symbols.

In step S47, the interleaved symbol IS<0:3> may be received. The receiving circuit 221 may receive the PAM-4 signal PSI from the first transmission signal bus 201 or the second transmission signal bus 202, and restore the interleaved symbol IS<0:3> on the basis of the PAM-4 signal PSI. The receiving circuit 221 may provide the interleaved symbol IS<0:3> to the symbol decoding circuit 222. In step S48, the decoded burst and the interleaved symbol IS<0:3> may be combined. The symbol decoding circuit 222 may generate a plurality of bursts by combining the interleaved symbol IS<0:3> and the plurality of decoded bursts, and the plurality of bursts may be provided as the full burst DI<0:31> of the input data.

Figure 5:
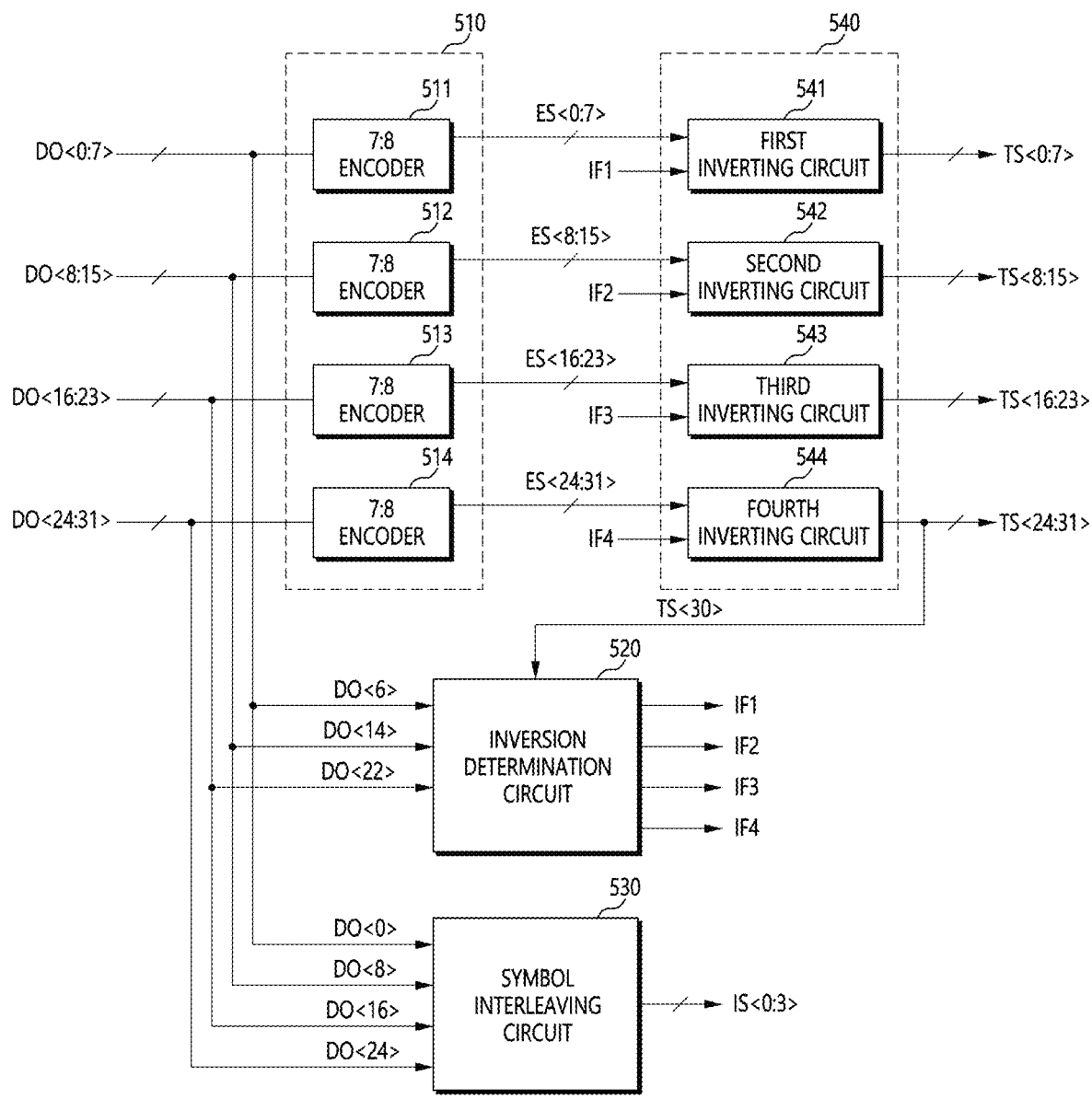
FIG. 5 is a diagram illustrating a configuration of a symbol encoding circuit illustrated in FIG. 2.

FIG. 5 is a diagram illustrating the configuration of the symbol encoding circuit 211 illustrated in FIG. 2. Referring to FIG. 5, the symbol encoding circuit 211 may include an encoding block 510, an inversion determination circuit 520, a symbol interleaving circuit 530, and an inversion block 540. The encoding block 510 may receive the first to fourth bursts DO<0:7>, DO<8:15>, DO<16:23>, and DO<24:31> of the output data and generate first to fourth encoded symbols ES<0:7>, ES<8:15>, ES<16:23>, and ES<24:31> by encoding the first to fourth bursts DO<0:7>, DO<8:15>, DO<16:23>, and DO<24:31>. At least one bit of each of the first to fourth bursts DO<0:7>, DO<8:15>, DO<16:23>, and DO<24:31> may be provided to the symbol interleaving circuit 530, and the encoding block 510 may generate the first to fourth encoded symbols ES<0:7>, ES<8:15>, ES<16:23>, and ES<24:31> by encoding the remaining bits of each of the first to fourth bursts DO<0:7>, DO<8:15>, DO<16:23>, and DO<24:31>. In an embodiment, remaining bits of a burst may be all of the bits of the burst exception at least one bit from the burst that is provided to the symbol interleaving circuit 530. The encoding block 510 may include first to fourth encoders 511 to 514. The first to fourth encoders 511 to 514 may each be a 7:8 encoder. The first encoder 511 may generate the first encoded symbol ES<0:7> having 8 bits by encoding 7 bits of the first burst DO<0:7>. The second encoder 512 may generate the second encoded symbol ES<8:15> having 8 bits by encoding 7 bits of the second burst DO<8:15>. The third encoder 513 may generate the third encoded symbol ES<16:23> having 8 bits by encoding 7 bits of the third burst DO<16:23>. The fourth encoder 514 may generate the fourth encoded symbol ES<24:31> having 8 bits by encoding 7 bits of the fourth burst DO<24:31>. The first to fourth encoders 511 to 514 may each map the 7-bit burst to an 8-bit encoded symbol on the basis of the code book. The first to fourth encoders 511 to 514 may each match the logic level of a bit with a specific sequence number of the burst with the logic level of a bit with a specific sequence number of the encoded symbol. For example, the first encoder 511 may perform encoding so that the logic level of the last most significant bit DO<6> of the first burst and the logic level of the last most significant bit ES<6> of the first encoded symbol are substantially the same as each other. The second encoder 512 may perform encoding so that the logic level of the last most significant bit DO<14> of the second burst and the logic level of the last most significant bit ES<14> of the second encoded symbol are substantially the same as each other. The third encoder 513 may perform encoding so that the logic level of the last most significant bit DO<22> of the third burst and the logic level of the last most significant bit ES<22> of the third encoded symbol are substantially the same as each other. The fourth encoder 514 may perform encoding so that the logic level of the last most significant bit DO<30> of the fourth burst and the logic level of the last most significant bit ES<30> of the fourth encoded symbol are substantially the same as each other.

Figure 6:
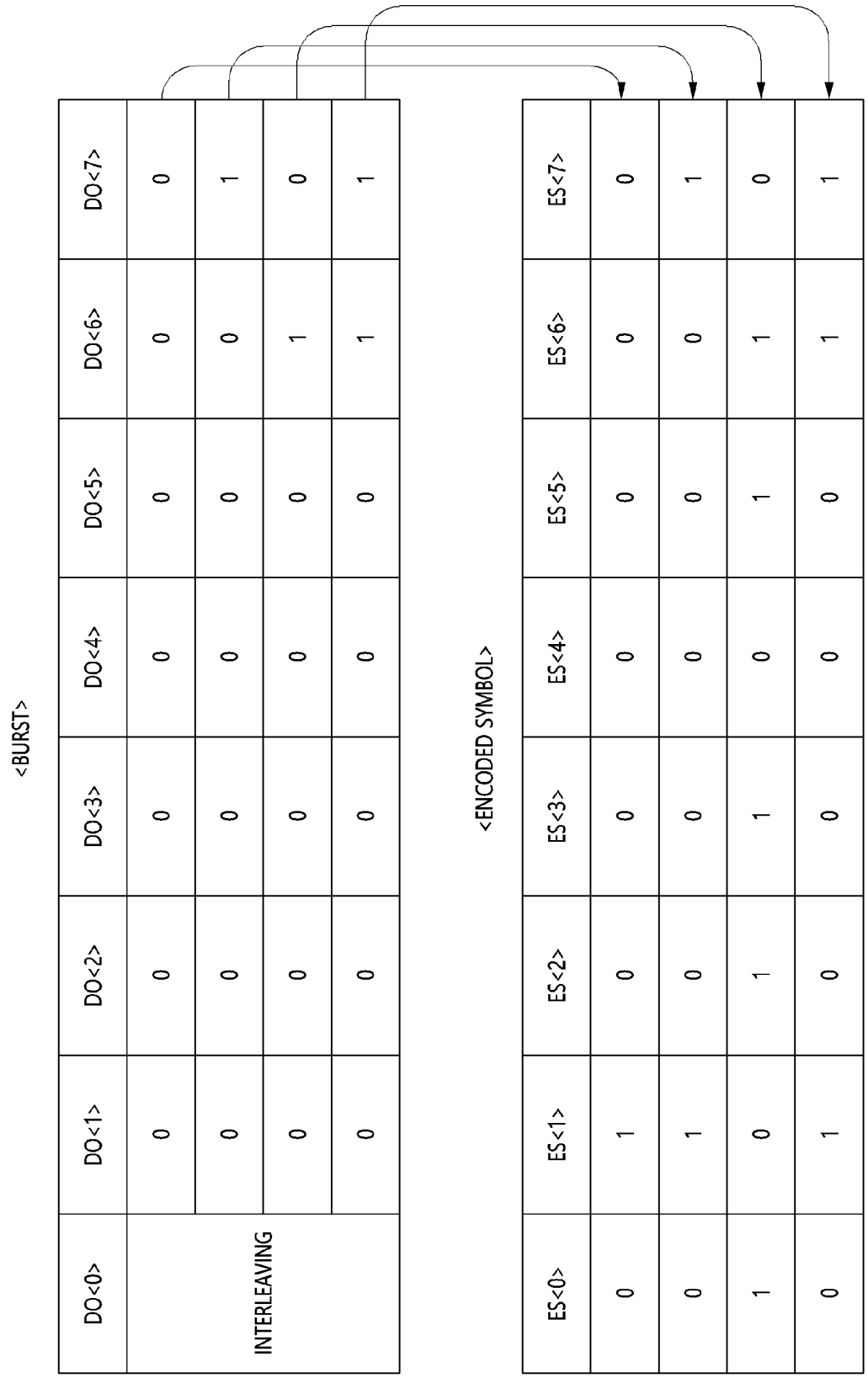
FIG. 6 is a diagram illustrating an example of a 7:8 codebook in accordance with an embodiment of the present disclosure.

FIG. 6 is a diagram illustrating an example of a 7:8 code book according to an embodiment of the present disclosure. Referring to FIG. 6, the burst may be mapped to the encoded symbol according to the code book. The encoded symbol may have a logic value capable of avoiding a maximum transition. In the code book, the seventh bit DO<6> of the burst and the seventh bit ES<6> of the encoded symbol may substantially maintain the same logic level. The first bit DO<0> of the burst may be provided to the symbol interleaving circuit 530 for interleaving. With reference to the code book, the encoded symbol ES<0:7> having 8 bits may be selected according to logic values of the second to eighth bits DO<1:7> of the burst.

Referring back to FIG. 5, the inversion determination circuit 520 may receive a bit with a specific sequence number of each of the first to third bursts DO<0:7>, DO<8:15>, and DO<16:23>. For example, the inversion determination circuit 520 may receive a bit with a specific sequence number of each of the burst and the encoded symbol, the bits maintaining substantially the same logic value. For example, in an embodiment, the specific sequence number may be 7 and thus, the inversion determination circuit 520 may receive the seventh bit DO<6> of the first burst, the seventh bit DO<14> of the second burst, and the seventh bit DO<22> of the third burst. The inversion determination circuit 520 may generate a second inversion signal IF2 on the basis of the logic level of the seventh bit DO<6> of the first burst. The inversion determination circuit 520 may enable the second inversion signal IF2 when the logic level of the seventh bit DO<6> of the first burst is 1, and disable the second inversion signal IF2 when the logic level of the seventh bit DO<6> of the first burst is 0. The inversion determination circuit 520 may generate a third inversion signal IF3 on the basis of the logic level of the seventh bit DO<14> of the second burst. The inversion determination circuit 520 may enable the third inversion signal IF3 when the logic level of the seventh bit DO<14> of the second burst is 1, and disable the third inversion signal IF3 when the logic level of the seventh bit DO<14> of the second burst is 0. The inversion determination circuit 520 may generate a fourth inversion signal IF4 on the basis of the logic level of the seventh bit DO<22> of the third burst. The inversion determination circuit 520 may enable the fourth inversion signal IF4 when the logic level of the seventh bit DO<22> of the third burst is 1, and disable the fourth inversion signal IF4 when the logic level of the seventh bit DO<22> of the third burst is 0. The inversion determination circuit 520 may generate a first inversion signal IF1 on the basis of a transmitting symbol to be described below.

The inversion block 540 may receive the first to fourth encoded symbols ES<0:7>, ES<8:15>, ES<16:23>, and ES<24:31> from the encoding block 510. The inversion block 540 may selectively invert the first to fourth encoded symbols ES<0:7>, ES<8:15>, ES<16:23>, and ES<24:31> on the basis of the first to fourth inversion signals IF1 to IF4, thereby generating the first to fourth transmitting symbols TS<0:7>, TS<8:15>, TS<16:23>, and TS<24:31>. The inversion block 540 may include a first inverting circuit 541, a second inverting circuit 542, a third inverting circuit 543, and a fourth inverting circuit 544. The first inverting circuit 541 may receive the first encoded symbol ES<0:7> and the first inversion signal IF1 and selectively invert the first encoded symbol ES<0:7> on the basis of the first inversion signal IF1, thereby generating the first transmitting symbol TS<0:7>. When the first inversion signal IF1 is enabled, the first inverting circuit 541 may generate the first transmitting symbol TS<0:7> by inverting the most significant bits ES<0>, ES<2>, ES<4>, and ES<6> of the first encoded symbol ES<0:7>. When the first inversion signal IF1 is disabled, the first inverting circuit 541 may provide the first encoded symbol ES<0:7> as is as the first transmitting symbol TS<0:7> without inverting the first encoded symbol ES<0:7>. The second inverting circuit 542 may receive the second encoded symbol ES<8:15> and the second inversion signal IF2 and selectively invert the second encoded symbol ES<8:15> on the basis of the second inversion signal IF2, thereby generating the second transmitting symbol TS<8:15>. When the second inversion signal IF2 is enabled, the second inverting circuit 542 may generate the second transmitting symbol TS<8:15> by inverting the most significant bits ES<8>, ES<10>, ES<12>, and ES<14> of the second encoded symbol ES<8:15>. When the second inversion signal IF2 is disabled, the second inverting circuit 542 may provide the second encoded symbol ES<8:15> as is as the second transmitting symbol TS<8:15> without inverting the second encoded symbol ES<8:15>. The third inverting circuit 543 may receive the third encoded symbol ES<16:23> and the third inversion signal IF3 and selectively invert the third encoded symbol ES<16:23> on the basis of the third inversion signal IF3, thereby generating the third transmitting symbol TS<16:23>. When the third inversion signal IF3 is enabled, the third inverting circuit 543 may generate the third transmitting symbol TS<16:23> by inverting the most significant bits ES<16>, ES<18>, ES<20>, and ES<22> of the third encoded symbol ES<16:23>. When the third inversion signal IF3 is disabled, the third inverting circuit 543 may provide the third encoded symbol ES<16:23> as is as the third transmitting symbol TS<16:23> without inverting the third encoded symbol ES<16:23>. The fourth inverting circuit 544 may receive the fourth encoded symbol ES<24:31> and the fourth inversion signal IF4 and selectively invert the fourth encoded symbol ES<24:31> on the basis of the fourth inversion signal IF4, thereby generating the fourth transmitting symbol TS<24:31>. When the fourth inversion signal IF4 is enabled, the fourth inverting circuit 544 may generate the fourth transmitting symbol TS<24:31> by inverting the most significant bits ES<24>, ES<26>, ES<28>, and ES<30> of the fourth encoded symbol ES<24:31>. When the fourth inversion signal IF4 is disabled, the fourth inverting circuit 544 may provide the fourth encoded symbol ES<24:31> as is as the fourth transmitting symbol TS<24:31> without inverting the fourth encoded symbol ES<24:31>.

The inversion determination circuit 520 may receive a transmitting symbol generated before the first transmitting symbol TS<0:7> is generated, and generate the first inversion signal IF1 on the basis of the previously generated transmitting symbol. The inversion determination circuit 520 may receive the fourth transmitting symbol TS<24:31>. The inversion determination circuit 520 may store the seventh bit TS<30> of the fourth transmitting symbol, and generate the first inversion signal IF1 on the basis of the logic level of the seventh bit TS<30> of the fourth transmitting symbol. When the first to fourth bursts DO<0:7>, DO<8:15>, DO<16:23>, and DO<24:31> are transmitted, the inversion decision circuit 520 may be in a state of storing the seventh bit TS<30> of the previously generated fourth transmitting symbol. The inversion determination circuit 520 may enable the first inversion signal IF1 when the seventh bit TS<30> of the previously generated fourth transmitting symbol is 1, and disable the first inversion signal IF1 when the seventh bit TS<30> of the previously generated fourth transmitting symbol is 0.

The symbol interleaving circuit 530 may receive at least one bit of each of the first to fourth bursts DO<0:7>, DO<8:15>, DO<16:23>, and DO<24:31>. The symbol interleaving circuit 530 may receive the first bits DO<0>, DO<8>, DO<16>, and DO<24> of the first to fourth bursts. The symbol interleaving circuit 530 may generate the interleaved symbol IS<0:3> on the basis of the first bits DO<0>, DO<8>, DO<16>, and DO<24> of the first to fourth bursts. For example, the symbol interleaving circuit 530 may sequentially provide the first bits DO<0>, DO<8>, DO<16>, and DO<24> of the first to fourth bursts as the first to fourth bits of the interleaved symbol IS<0:3>.

Figure 7:
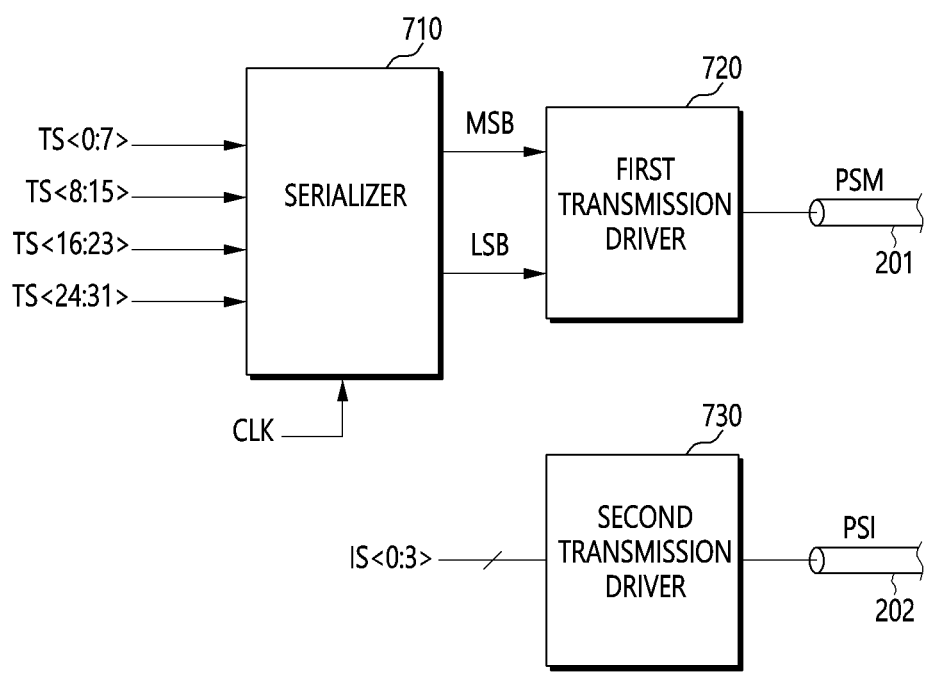
FIG. 7 is a diagram illustrating a configuration of a transmitting circuit illustrated in FIG. 2.

FIG. 7 is a diagram illustrating the configuration of the transmitting circuit 212 illustrated in FIG. 2. Referring to FIG. 7, the transmitting circuit 212 may include a serializer 710 and a first transmission driver 720. The serializer 710 may receive the first to fourth transmitting symbols TS<0:7>, TS<8:15>, TS<16:24>, and TS<25:31> from the symbol encoding circuit 211. The serializer 710 may sequentially output the first to fourth transmitting symbols TS<0:7>, TS<8:15>, TS<16:24>, and TS<25:31> in synchronization with a clock signal CLK. The serializer 710 may sequentially output the most significant bit MSB and the least significant bit LSB of one unit symbol in synchronization with the clock signal CLK. For example, the serializer 710 may sequentially output the four symbols TS<0:1>, TS<2:3>, TS<4:5>, and TS<6:7> of the first transmitting symbol, the four symbols TS<8:9>, TS<10:11>, TS<12:13>, and TS<14:15> of the second transmitting symbol, the four symbols TS<16:17>, TS<18:19>, TS<20:21>, and TS<22:23> of the third transmitting symbol, and the four symbols TS<24:25>, TS<26:27>, TS<28:29>, and TS<30:31> of the fourth transmitting symbol.

The first transmission driver 720 may receive the most significant bits MSB and the least significant bits LSB of the symbols from the serializer 710. The first transmission driver 720 may be connected to the first transmission signal bus 201, and transmit the PAM-4 signal PSM by driving the first transmission signal bus 201 on the basis of the most significant bit MSB and least significant bit LSB of the symbol output from the serializer 710. The first transmission driver 720 may drive the first transmission signal bus 201 to one of the four different voltage levels V1 to V4 illustrated in FIG. 1, on the basis of the symbol.

The transmitting circuit 212 may further include a second transmission driver 730. The second transmission driver 730 may receive the interleaved symbol IS<0:3> from the symbol interleaving circuit 530 of the symbol encoding circuit 211. The second transmission driver 730 may be connected to the second transmission signal bus 202, and may transmit the PAM-4 signal PSI by driving the second transmission signal bus 202 on the basis of the interleaved symbol IS<0:3>.

Figure 8:
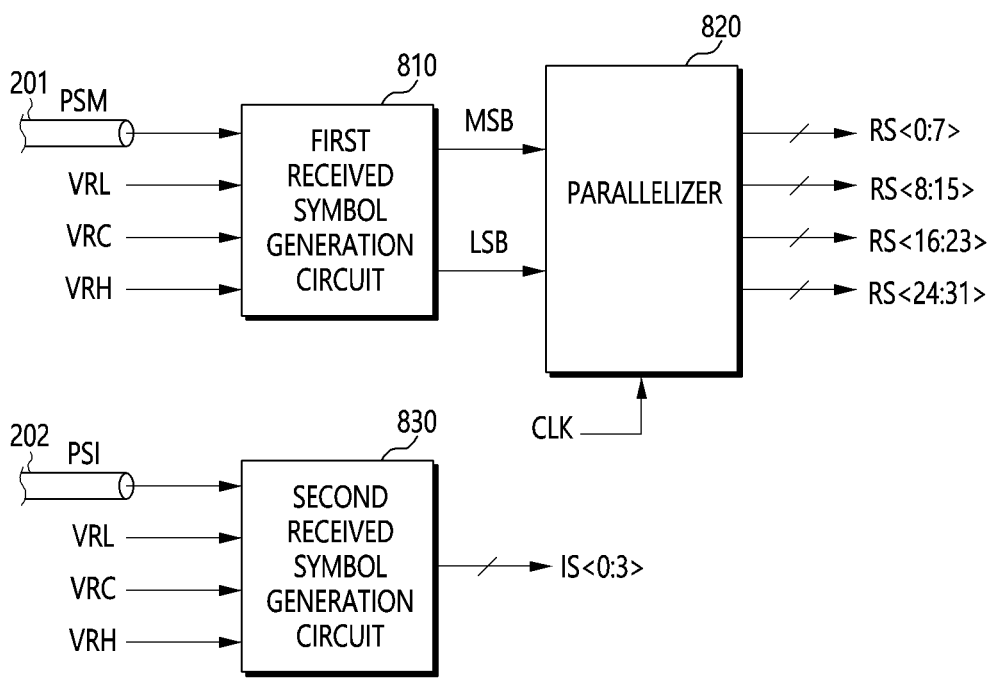
FIG. 8 is a diagram illustrating a configuration of a receiving circuit illustrated in FIG. 2.

FIG. 8 is a diagram illustrating the configuration of the receiving circuit 221 illustrated in FIG. 2. Referring to FIG. 8, the receiving circuit 221 may include a first received symbol generation circuit 810 and a parallelizer 820. The first received symbol generation circuit 810 may be connected to the first transmission signal bus 201 and may receive the PAM-4 signal PSM transmitted through the first transmission signal bus 201. The first received symbol generation circuit 810 may receive first to third reference voltages VRL, VRC, and VRH in order to determine the logic level of the PAM-4 signal PSM. The first to third reference voltages VRL, VRC, and VRH may have different voltage levels so that the voltage level of the PAM-4 signal PSM may be determined. Referring to FIG. 1 together, the first reference voltage VRL may have a voltage level between the first voltage level V1 and the second voltage level V2. The second reference voltage VRC may have a voltage level between the second voltage level V2 and the third voltage level V3. The third reference voltage VRH may have a voltage level between the third voltage level V3 and the fourth voltage level V4. The first received symbol generation circuit 810 may generate a plurality of symbols corresponding to the PAM-4 signal PSM. The symbol may include a most significant bit MSB and a least significant bit LSB. When the voltage level of the PAM-4 signal PSM is lower than the first reference voltage VRL, the first received symbol generation circuit 810 may output a symbol having a logic level of 0, 0, and when the voltage level of the PAM-4 signal PSM is between the first and second reference voltages VRL and VRC, the first received symbol generation circuit 810 may output a symbol having a logic level of 0, 1. When the voltage level of the PAM-4 signal PSM is between the second and third reference voltages VRC and VRH, the first received symbol generation circuit 810 may output a symbol having a logic level of 1, 0, and when the voltage level of the PAM-4 signal PSM is higher than the third reference voltage VRH, the first received symbol generation circuit 810 may output a symbol having a logic level of 1, 1.

The parallelizer 820 may be connected to the first received symbol generation circuit 810 and may receive the most significant bit MSB and the least significant bit LSB of the symbol generated by the first received symbol generation circuit 810. The parallelizer 820 may receive a plurality of symbols from the first received symbol generation circuit 810 and generate the first to fourth received symbols RS<0:7>, RS<8:15>, RS<16:23>, and RS<24:31>. The parallelizer 820 may sequentially store the plurality of symbols in synchronization with the clock signal CLK, and output the plurality of stored symbols as the first to fourth received symbols RS<0:7>, RS<8:15>, RS<16:23>, and RS<24:31>. The first received symbol RS<0:7> may have substantially the same logic value as the first transmitting symbol TS<0:7>, and the second received symbol RS<8:15> may have substantially the same logic value as the second transmitting symbol TS<8:15>. The third received symbol RS<16:23> may have substantially the same logic value as the third transmitting symbol TS<16:23>, and the fourth received symbol RS<24:31> may have substantially the same logic value as the fourth transmitting symbol TS<24:31>.

The receiving circuit 221 may further include a second received symbol generation circuit 830. The second received symbol generation circuit 830 may be connected to the second transmission signal bus 202 and may receive the PAM-4 signal PSI transmitted through the second transmission signal bus 202. The second received symbol generation circuit 830 may receive the first to third reference voltages VRL, VRC, and VRH in order to determine the logic level of the PAM-4 signal PSI. The second received symbol generation circuit 830 may determine the voltage level of the PAM-4 signal PSI on the basis of the first to third reference voltages VRL, VRC, and VRH, and restore the interleaved symbol IS<0:3>.

Figure 9:
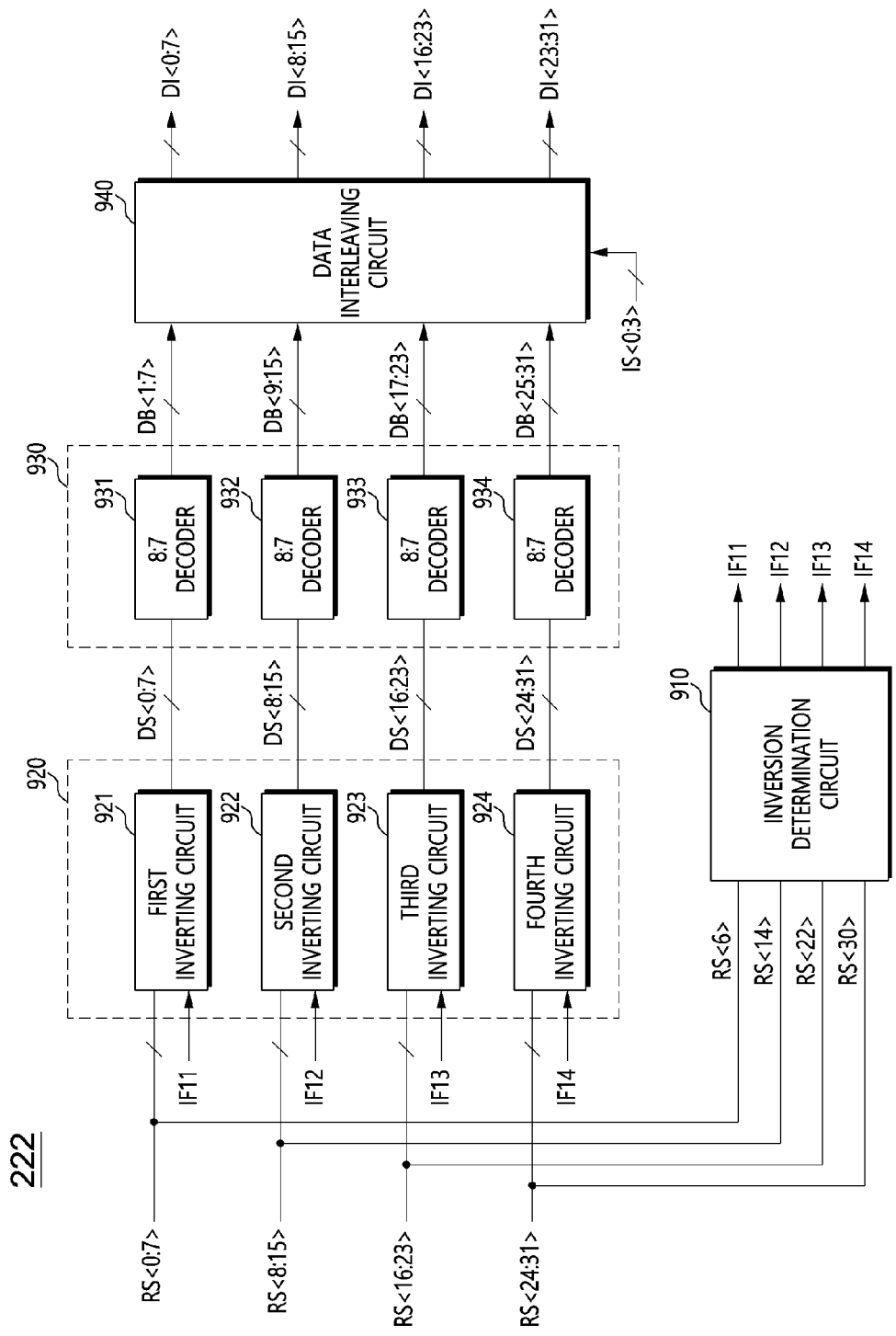
FIG. 9 is a diagram illustrating a configuration of a symbol decoding circuit illustrated in FIG. 2.

FIG. 9 is a diagram showing the configuration of the symbol decoding circuit 222 illustrated in FIG. 2. Referring to FIG. 9, the symbol decoding circuit 222 may include an inversion determination circuit 910, an inversion block 920, a decoding block 930, and a data interleaving circuit 940. The inversion determination circuit 910 may receive a bit with a specific sequence number of each of the first to fourth received symbols RS<0:7>, RS<8:15>, RS<16:23>, and RS<24:31>. The inversion determination circuit 910 may generate first to fourth inversion signals IF11 to IF14 on the basis of the bit with the specific sequence number of each of the first to fourth received symbols RS<0:7>, RS<8:15>, RS<16:23>, and RS<24:31>. The inversion determination circuit 910 may receive the seventh bit RS<6> of the first received symbol, the seventh bit RS<14> of the second received symbol, the seventh bit RS<22> of the third received symbol, and the seventh bit RS<30> of the fourth received symbol. The inversion determination circuit 910 may generate the second inversion signal IF12 on the basis of the seventh bit RS<6> of the first received symbol. The inversion determination circuit 910 may enable the second inversion signal IF12 when the seventh bit RS<6> of the first received symbol is 1, and disable the second inversion signal IF12 when the seventh bit RS<6> of the first received symbol is 0. The inversion determination circuit 910 may generate the third inversion signal IF13 on the basis of the seventh bit RS<14> of the second received symbol. The inversion determination circuit 910 may enable the third inversion signal IF13 when the seventh bit RS<14> of the second received symbol is 1, and disable the third inversion signal IF13 when the seventh bit RS<14> of the second received symbol is 0. The inversion determination circuit 910 may generate the fourth inversion signal IF14 on the basis of the seventh bit RS<22> of the third received symbol. The inversion determination circuit 910 may enable the fourth inversion signal IF14 when the seventh bit RS<22> of the third received symbol is 1, and disable the fourth inversion signal IF14 when the seventh bit RS<22> of the third received symbol is 0. The inversion determination circuit 910 may store the seventh bit RS<30> of the fourth received symbol. The inversion determination circuit 910 may generate the first inversion signal IF11 on the basis of the seventh bit RS<30> of a previously generated fourth received symbol. Before the first to fourth received symbols RS<0:7>, RS<8:15>, RS<16:23>, and RS<24:31> are inputted, the inversion determination circuit 910 may be in a state of storing the seventh bit RS<30 of the previously generated fourth received symbol. The inversion determination circuit 910 may enable the first inversion signal IF11 when the seventh bit RS<30> of the previously generated fourth received symbol is 1, and disable the first inversion signal IF11 when the seventh bit RS<30> of the previously generated fourth received symbol is 0.

The inversion block 920 may receive the first to fourth received symbols RS<0:7>, RS<8:15>, RS<16:23>, and RS<24:31>, and receive the first to fourth inversion signals IF11 to IF14 from the inversion determination circuit 910. The inversion block 920 may generate the first to fourth decoded symbols DS<0:7>, DS<8:15>, DS<16:23>, and DS<24:31> by selectively inverting the first to fourth received symbols RS<0:7>, RS<8:15>, RS<16:23>, and RS<24:31> on the basis of the first to fourth inversion signals IF11 to IF14. Referring to FIG. 5 together, the first decoded symbol DS<0:7> may have substantially the same logic value as the first encoded symbol ES<0:7>, and the second decoded symbol DS<8:15> may have substantially the same logic value as the second encoded symbol ES<8:15>. The third decoded symbol DS<16:23> may have substantially the same logic value as the third encoded symbol ES<16:23>, and the fourth decoded symbol DS<24:31> may have substantially the same logic value as the fourth encoded symbol ES<24:31>.

The inversion block 920 may include a first inverting circuit 921, a second inverting circuit 922, a third inverting circuit 923, and a fourth inverting circuit 924. The first inverting circuit 921 may receive the first received symbol RS<0:7> and the first inversion signal IF11, and generate the first decoded symbol DS<0:7> by selectively inverting the first received symbol RS<0:7> on the basis of the first inversion signal IF11. When the first inversion signal IF11 is enabled, the first inverting circuit 921 may generate the first decoded symbol DS<0:7> by inverting the most significant bits RS<0>, RS<2>, RS<4>, and RS<6> of the first received symbol RS<0:7>. When the first inversion signal IF11 is disabled, the first inverting circuit 921 may provide the first received symbol RS<0:7> as is as the first decoded symbol DS<0:7> without inverting the first received symbol RS<0:7>. The second inverting circuit 922 may receive the second received symbol RS<8:15> and the second inversion signal IF12, and generate the second decoded symbol DS<8:15> by selectively inverting the second received symbol RS<8:15> on the basis of the second inversion signal IF12. When the second inversion signal IF12 is enabled, the second inverting circuit 922 may generate the second decoded symbol DS<8:15> by inverting the most significant bits RS<8>, RS<10>, RS<12>, and RS<14> of the second received symbol RS<8:15>. When the second inversion signal IF12 is disabled, the second inverting circuit 922 may provide the second received symbol RS<8:15> as is as the second decoded symbol DS<8:15> without inverting the second received symbol RS<8:15>. The third inverting circuit 923 may receive the third received symbol RS<16:23> and the third inversion signal IF13, and generate the third decoded symbol DS<16:23> by selectively inverting the third received symbol RS<16:23> on the basis of the third inversion signal IF13. When the third inversion signal IF13 is enabled, the third inverting circuit 923 may generate the third decoded symbol DS<16:23> by inverting the most significant bits RS<16>, RS<18>, RS<20>, and RS<22> of the third received symbol RS<16:23>. When the third inversion signal IF13 is disabled, the third inverting circuit 923 may provide the third received symbol RS<16:23> as is as the third decoded symbol DS<16:23> without inverting the third received symbol RS<16:23>. The fourth inverting circuit 924 may receive the fourth received symbol RS<24:31> and the fourth inversion signal IF14, and generate the fourth decoded symbol DS<24:31> by selectively inverting the fourth received symbol RS<24:31> on the basis of the fourth inversion signal IF14. When the fourth inversion signal IF14 is enabled, the fourth inverting circuit 924 may generate the fourth decoded symbol DS<24:31> by inverting the most significant bits RS<24>, RS<26>, RS<28>, and RS<30> of the fourth received symbol RS<24:31>. When the fourth inversion signal IF14 is disabled, the fourth inverting circuit 924 may provide the fourth received symbol RS<24:31> as is as the fourth decoded symbol DS<24:31> without inverting the fourth received symbol RS<24:31>.

The decoding block 930 may receive the first to fourth decoded symbols DS<0:7>, DS<8:15>, DS<16:23>, and DS<24:31> from the inversion block 920. The decoding block 930 may generate first to fourth decoded bursts DB<1:7>, DB<9:15>, DB<17:23>, and DB<25:31> by decoding the first to fourth decoded symbols DS<0:7>, DS<8:15>, DS<16:23>, and DS<24:31>. The decoding block 930 may include first to fourth decoders 931 to 934. In an embodiment, the first to fourth decoders 931 to 934 may each be a 8:7 decoder. The first decoder 931 may generate the first decoded burst DB<1:7> having 7 bits by decoding 8 bits of the first decoded symbol DS<0:7>. The second decoder 932 may generate the second decoded burst DB<9:15> having 7 bits by decoding 8 bits of the second decoded symbol DS<8:15>. The third encoder 933 may generate the third decoded burst DB<17:23> having 7 bits by decoding 8 bits of the third decoded symbol DS<16:23>. The fourth decoder 934 may generate the fourth decoded burst DB<25:31> having 7 bits by decoding 8 bits of the fourth decoded symbol DS<24:31>. The first to fourth decoders 931 to 934 may map the 8-bit decoded symbol to a 7-bit decoded burst on the basis of the code book illustrated in FIG. 6.

The data interleaving circuit 940 may receive the first to fourth decoded bursts DB<1:7>, DB<9:15>, DB<17:23>, and DB<25:31> from the decoding block 930, and receive the interleaved symbol IS<0:3>. The data interleaving circuit 940 may generate the first to fourth bursts DI<0:7>, DI<8:15> DI<16:23>, and DI<24:31> of the input data by combining the first to fourth decoded bursts DB<1:7>, DB<9:15>, DB<17:23>, and DB<25:31> with bits of the interleaved symbol IS<0:3>. The data interleaving circuit 940 may generate the first burst DI<0:7> of the input data by combining 7 bits of the first decoded burst DB<0:7> and 1 bit (IS<0>) of the interleaved symbol. The data interleaving circuit 940 may generate the second burst DI<8:15> of the input data by combining 7 bits of the second decoded burst DB<9:15> and 1 bit (IS<1>) of the interleaved symbol. The data interleaving circuit 940 may generate the third burst DI<16:23> of the input data by combining 7 bits of the third decoded burst DB<17:23> and 1 bit (IS<2>) of the interleaved symbol. The data interleaving circuit 940 may generate the fourth burst DI<24:31> of the input data by combining 7 bits of the fourth decoded burst DB<25:31> and 1 bit (IS<3>) of the interleaved symbol.

A person skilled in the art to which the present disclosure pertains can understand that the present disclosure may be carried out in other specific forms without changing its technical spirit or essential features. Therefore, it should be understood that the embodiments described above are illustrative in all aspects, not limitative. The scope of the present disclosure is defined by the claims to be described below rather than the detailed description, and it should be construed that all changes or modified forms derived from the meaning and scope of the claims and the equivalent concept thereof are included in the scope of the present disclosure.

What is claimed is:

1. A transmitting device comprising:
 an inversion determination circuit configured to receive a bit with a specific sequence number of a second transmitting symbol and a bit with the specific sequence number of a first burst, configured to enable and generate a first inversion signal according to a logic level of the bit with the specific sequence number of the second transmitting symbol, and configured to enable and generate a second inversion signal according to a logic level of the bit with the specific sequence number of the first burst;
 an encoding block configured to receive the first burst and a second burst, configured to encode the first burst to generate a first encoded symbol, and configured to encode the second burst to generate a second encoded symbol; and
 an inversion block configured to generate a first transmitting symbol by selectively inverting the first encoded symbol based on whether the first inversion signal is enabled, and to generate the second transmitting symbol by selectively inverting the second encoded symbol based on whether the second inversion signal is enabled.

2. The transmitting device according to claim 1, wherein the inversion determination circuit enables the first inversion signal when the logic level of the bit with the specific sequence number of the second transmitting symbol has a first logic level, and disables the first inversion signal when the logic level of the bit with the specific sequence number of the second transmitting symbol has a second logic level, and wherein the first logic level is different from the second logic level.

3. The transmitting device according to claim 1, wherein the inversion determination circuit enables the second inversion signal when the logic level of the bit with the specific sequence number of the first burst has a first logic level, and disables the second inversion signal when the logic level of the bit with the specific sequence number of the first burst has a second logic level, and wherein the first logic level is different from the second logic level.

4. The transmitting device according to claim 1, wherein the bit with the specific sequence number is a last most significant bit of each of the second transmitting symbol and the first burst.

5. The transmitting device according to claim 1, wherein the encoding block generates the first and second encoded symbols by encoding the first and second bursts so that a maximum transition is avoided, and substantially maintains a logic level of a bit with a specific sequence number of each of the first and second encoded symbols to be substantially identical to a logic level of a bit with a specific sequence number of each of the first and second bursts.

6. The transmitting device according to claim 1, further comprising:
a symbol interleaving circuit configured to generate an interleaved symbol on the basis of at least one bit of each of the first and second bursts,
wherein the encoding block generates the first and second encoded symbols by encoding remaining bits of the first and second bursts, respectively.

7. The transmitting device according to claim 1, further comprising:
a transmitting circuit configured to transmit a 4-level pulse amplitude modulation (PAM-4) signal through a transmission signal bus on the basis of the first and second transmitting symbols.

8. The transmitting device according to claim 7, further comprising:
a serializer configured to generate a plurality of unit symbols each including one most significant bit and one least significant bit by serializing the first and second transmitting symbols; and
a transmission driver configured to drive a transmission signal bus by a PAM-4 signal on the basis of the plurality of unit symbols.

9. A transmitting and receiving method comprising:
dividing output data into a first burst and a second burst;
determining whether a bit with a specific sequence number of a second transmitting symbol has a first logic level and a bit with a specific sequence number of a first burst has the first logic level;
generating a first encoded symbol by encoding the first burst and generating a second encoded symbol by encoding the second burst, so that a maximum transition is avoided;
generating a first transmitting symbol and the second transmitting symbol by selectively inverting the first encoded symbol and the second encoded symbol on the basis of results of the determination; and
transmitting a 4-level pulse amplitude modulation (PAM-4) signal on the basis of the first transmitting symbol and the second transmitting symbol.

10. The transmitting and receiving method according to claim 9, wherein a logic level of the bit with the specific sequence number of each of the plurality of bursts matches a logic level of a bit with a specific sequence number of each of the plurality of encoded symbols.

11. The transmitting and receiving method according to claim 9, further comprising:
before the generating the plurality of encoded symbols, providing at least one bit of the plurality of bursts as an interleaved symbol,
wherein, in the generating the plurality of encoded symbols, the plurality of encoded symbols are generated by encoding remaining bits of the plurality of bursts, respectively.

12. The transmitting and receiving method according to claim 11, further comprising:
transmitting a PAM-4 signal on the basis of the interleaved symbol at the same time or after the transmitting the PAM-4 signal.

13. The transmitting and receiving method according to claim 9, further comprising:
receiving the PAM-4 signal and generating a plurality of received symbols;
determining whether a bit with a specific sequence number of the previously received symbol has a first logic level and generating a plurality of decoded symbols by selectively inverting the plurality of received symbols according to a result of the determination; and
generating a plurality of decoded bursts by decoding the plurality of decoded symbols.

14. The transmitting and receiving method according to claim 13, further comprising:
receiving an interleaved symbol at the same time or after the generating the plurality of received symbols; and
generating input data by combining the plurality of decoded bursts and the interleaved symbol.

15. A transmitting and receiving system comprising:
a transmitting device configured to transmit a 4-level pulse amplitude modulation (PAM-4) signal; and
a receiving device configured to receive the PAM-4 signal,
wherein the transmitting device comprises:
a symbol encoding circuit configured to divide output data into a first burst and a second burst, to generate a first encoded symbol by encoding the first burst, and to generate a second encoded symbol by encoding the second burst, to selectively invert the first encoded symbol to generate a first transmitting symbol by determining whether a logic level of a bit with a specific sequence number of a second transmitting symbol is 1, and to selectively invert the second encoded symbol to generate the second transmitting symbol by determining whether a logic level of a bit with a specific sequence number of the first burst is 1; and a transmitting circuit configured to transmit the PAM-4 signal on the basis of the first and second transmitting symbols.

16. The transmitting and receiving system according to claim 15, wherein the bit with the specific sequence number is a last most significant bit of each of the second transmitting symbol and the first burst.

17. The transmitting and receiving system according to claim 15, wherein the symbol encoding circuit causes a logic level of a bit with a specific sequence number of the first encoded symbol to match the logic level of the bit with the specific sequence number of the first burst, and causes a logic level of a bit with a specific sequence number of the second encoded symbol to match a logic level of a bit with a specific sequence number of the second burst.

18. The transmitting and receiving system according to claim 15, wherein the symbol encoding circuit comprises:
   an inversion determination circuit configured to generate a first inversion signal on the basis of the logic level of the bit with the specific sequence number of the second transmitting symbol, and to generate a second inversion signal on the basis of the logic level of the bit with the specific sequence number of the first burst;
   a first encoder configured to generate the first encoded symbol by encoding the first burst;
   a second encoder configured to generate the second encoded symbol by encoding the second burst;
   a first inverting circuit configured to generate the first transmitting symbol by selectively inverting the first encoded symbol on the basis of the first inversion signal; and
   a second inverting circuit configured to generate the second transmitting symbol by selectively inverting the second encoded symbol on the basis of the second inversion signal.

19. The transmitting and receiving system according to claim 18, further comprising:
   a symbol interleaving circuit configured to extract at least one bit of the first burst and at least one bit of the second burst, and to generate an interleaved symbol on the basis of the extracted bits,
   wherein the first encoder generates the first encoded symbol by encoding remaining bits of the first burst, and
   the second encoder generates the second encoded symbol by encoding remaining bits of the second burst.

20. The transmitting and receiving system according to claim 15, wherein the transmitting circuit comprises:
   a serializer configured to generate a plurality of unit symbols each including one most significant bit and one least significant bit by serializing the first and second transmitting symbols; and
   a transmission driver configured to drive a transmission signal bus by a PAM-4 signal on the basis of the plurality of unit symbols.

21. The transmitting and receiving system according to claim 15, further comprising:
   a receiving circuit configured to receive the PAM-4 signal and generate a first received symbol and a second received symbol; and
   a symbol decoding circuit configured to generate a first decoded symbol by selectively inverting the first received symbol on the basis of a logic level of a bit with a specific sequence number of a previously received symbol, to generate a second decoded symbol by selectively inverting the second received symbol on the basis of a logic level of a bit with a specific sequence number of the first received symbol, and to generate a first decoded burst and a second decoded burst by decoding the first and second decoded symbols, respectively.

22. The transmitting and receiving system according to claim 21, wherein the symbol decoding circuit comprises:
   a first inverting circuit configured to generate the first decoded symbol by selectively inverting the first received symbol on the basis of the logic level of the bit with the specific sequence number of the previously received symbol;
   a second inverting circuit configured to generate the second decoded symbol by selectively inverting the second received symbol on the basis of the logic level of the bit with the specific sequence number of the first received symbol;
   a first decoder configured to generate the first decoded burst by decoding the first decoded symbol; and
   a second decoder configured to generate the second decoded burst by decoding the second decoded symbol.

23. The transmitting and receiving system according to claim 22, further comprising:
   a data interleaving circuit configured to further receive an interleaved symbol and to generate input data on the basis of the first decoded burst, the second decoded burst, and the interleaved symbol.

* * * * *